(12) United States Patent
Lawrence

(10) Patent No.: US 9,961,297 B2
(45) Date of Patent: May 1, 2018

(54) METHOD AND SYSTEM OF ROTATION OF VIDEO FRAMES FOR DISPLAYING A VIDEO

(71) Applicant: Intel Corporation, Santa Clara, CA (US)

(72) Inventor: Sean J Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 14/998,190

(22) Filed: Dec. 26, 2015

(65) Prior Publication Data

US 2017/0187983 A1 Jun. 29, 2017

(51) Int. Cl.
| | |
|---|---|
| *H04N 5/775* | (2006.01) |
| *H04N 5/92* | (2006.01) |
| *H04N 5/262* | (2006.01) |
| *G11B 27/36* | (2006.01) |

(52) U.S. Cl.
CPC .............. *H04N 5/92* (2013.01); *G11B 27/36* (2013.01); *H04N 5/2628* (2013.01)

(58) Field of Classification Search
CPC ........ H04N 5/775; H04N 5/85; H04N 9/8042; G11B 27/34; G11B 27/105
USPC ........................................................ 386/230
See application file for complete search history.

(56) References Cited

U.S. PATENT DOCUMENTS

2008/0297532 A1* 12/2008 Gu .......................... G09G 3/20
345/600

OTHER PUBLICATIONS

"Audio Video Interleave", https://en.wikipedia.org/wiki/Audio_Video_Interleave, accessed Dec. 24, 2015, 4 pages.
"Extensible Metadata Platform", https://en.wikipedia.org/wiki/Extensible_Metadata_Platform, accessed May 9, 2016, 13 pages.
"Chapter 7—MPEG2 System Layer", https://www.uic.edu/classes/ece/ece434/chapter_file/chapter7.htm, accessed May 9, 2016, 11 pages.
"MPEG-4 Part 14", https://en.wikipedia.org/wiki/MPEG-4_Part_14#Metadata, accessed May 9, 2016, 9 pages.
"MPEG Transport Stream", https:en.wikipedia.org/wiki/MPEG_transport_stream, accessed May 9, 2016, 18 pages.

* cited by examiner

*Primary Examiner* — William C Vaughn, Jr.
*Assistant Examiner* — Daniel Tekle
(74) *Attorney, Agent, or Firm* — Green, Howard & Mughal LLP.

(57) ABSTRACT

A system, article, and method of rotation of video frames for displaying a video.

22 Claims, 10 Drawing Sheets

OBTAIN FRAMES OF A VIDEO SEQUENCE AND A PLURALITY OF DEVICE ORIENTATION INDICATORS EACH ASSOCIATED WITH A DIFFERENT FRAME OF THE VIDEO SEQUENCE AND THAT INDICATE AN ORIENTATION OF THE FRAME WHILE THE FRAME WAS RECORDED
302

↓

DETERMINE A VIEW ORIENTATION OF THE VIDEO SEQUENCE INDICATING AN ORIENTATION OF A DEVICE USING, OR TO BE USED, TO DISPLAY THE VIDEO SEQUENCE
304

↓

DETERMINE A FRAME OF THE VIDEO SEQUENCE IS TO BE ROTATED WHEN THE DEVICE ORIENTATION OF THE FRAME IS DIFFERENT THAN THE VIEW ORIENTATION, AND TO DISPLAY BOTH ROTATED AND NON-ROTATED FRAMES OF THE VIDEO SEQUENCE ACCORDING TO THE VIEW ORIENTATION 306

METHOD AND SYSTEM OF ROTATION OF VIDEO FRAMES FOR DISPLAYING A VIDEO

BACKGROUND

Many image capture devices such as handheld smartphones and tablets conventionally have a camera that records video and often has a rectangular screen that acts both as the viewer for the camera as well as the playback screen to watch the video after it is recorded. Otherwise, the recorded video may be transmitted to other devices to play the recorded video such as televisions, projectors, and so forth. A user recording video with such a handheld device may rotate the camera between a landscape view to position the screen so that the width is greater than the height of the screen, and a portrait view so that the height of the screen is greater than the width of the screen, either intentionally in order to attempt to capture a better view of the scene being recorded, or sometimes even unintentionally when the user of the camera does not even realize he/she is rotating the camera.

During display of the video, however, the image capture device may be oriented in a different rotational position than the orientation used to record the video, at least for part of the video. For instance, a video may be recorded mostly in a landscape mode but every once in a while, the user may rotate the camera to a portrait mode during the recording. Then, when the user subsequently holds the camera (or device with the camera) in a landscape orientation during display of the video, the portions of the video that were recorded in portrait mode will be shown on its side, which may be inconvenient, disorienting, and irritating to the viewer that is viewing the video on the device held to provide the screen in a landscape orientation.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart of a video frame rotation process for playing the video in accordance with the implementations herein;

DETAILED DESCRIPTION

Figure 1:
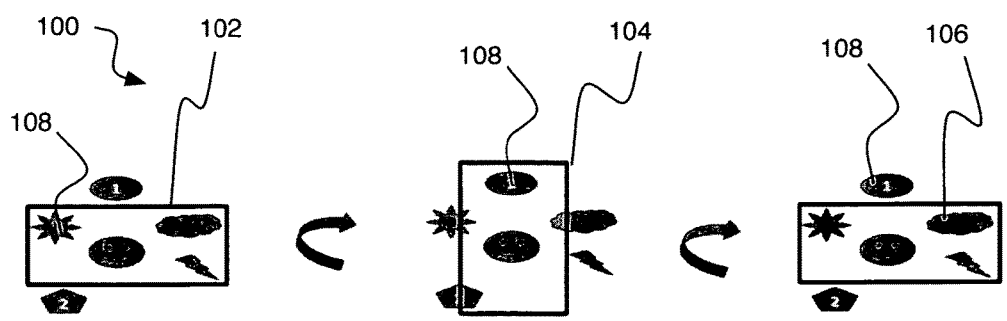
FIG. 1 is an illustration of a video sequence being recorded on an image capture device and the orientation of the image capture device during recording of the video.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of rotation of video frames for displaying a video.

A conventional mobile or handheld camera or electronic device with one or more cameras such as smartphones or tablets can capture or record video images in either a portrait mode or a landscape mode such that the device can capture rectangular images where one side is longer than the other. In the landscape mode, the width is greater than the height and vice versa for the portrait mode. These handheld devices then can be subsequently held in either a landscape or portrait orientation during display or playback of the video. A user may change the orientation of their device during video capture to better fit the rectangular field of view of the camera to the scene being recorded or otherwise for comfort or other factors due to the design, form factor, shape, and/or size of the recording device or camera. The user may do this intentionally but even unintentionally. When the video is recorded in one of the modes, but viewed in an orientation in the other mode, the video images may be displayed on their sides.

Figure 2:
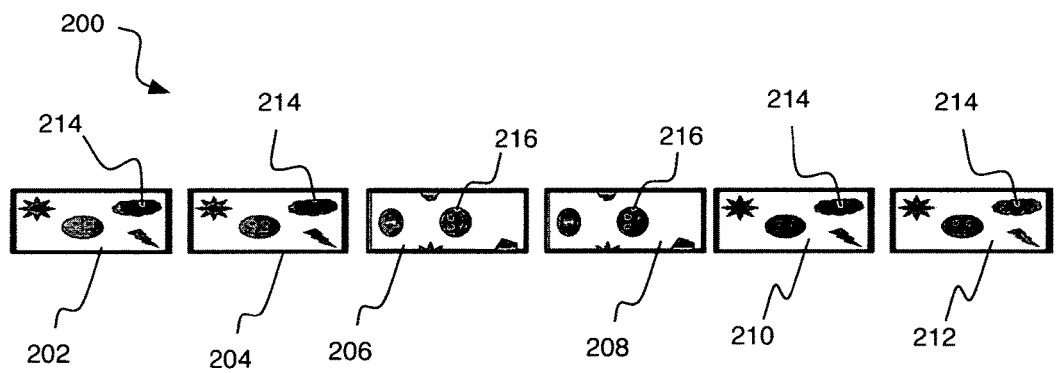
FIG. 2 is an illustration of a video sequence showing the orientation of a playback device and the scene in the video.

Referring to FIGS. 1-2 for example, during the recording of a scene 108, a recording sequence 100 may have camera capture views 102, 104, and 106 and that show how the camera was rotated during recording so that at first the camera is recording in a landscape mode to capture images of the scene 108 with a wider but shorter border or view 102. Then, the user may turn the camera, and in turn camera view or border 104, to a portrait mode so that the view is taller but narrower. Thereafter, the user may turn the camera, and view 106, back to a landscape mode as shown. The result may be video sequence 200 with frames 202, 204, 210, and 212 that show the same scene 214 in an upright orientation, while middle frames 206 and 208 show the scene 216, which is the same or similar to scene 214 except here on its side. Note, this may occur when the video is being played on a handheld device and occurs regardless of which orientation the handheld device is being held during the playing of the video. Specifically, in most of these handheld devices, an orientation sensor is on the device that detects whether the device is being held in landscape or portrait orientation. Thus, when first playing a video, the video is played upright according to the orientation the handheld device is held in during the playing of the video and no matter which orientation the handheld device is being held during the playing of the video. During the playback, however, if the orientation is switched during recording, those portions of the recording are viewed in the wrong orientation (such as sideways as shown in FIG. 2), and again, this occurs no matter which of the two orientations the handheld device playing the video is held in because currently this orientation information is stored once per video when recoding and/or transmitting the video. Changing the orientation of the handheld device during playback does not fix the problem either; the playing video will rotate so that portions of the video playing on its side will still play on its side. It will also be understood that the same result will occur when the video is transmitted to another device such as a television, projector, and so forth; the portions of the middle of the video recorded at a different orientation than the beginning of the video will be played on its side. As mentioned above, this results in images that are difficult to view and to comprehend what is being shown.

One attempt to resolve these issues is post-processing where a user may edit the video with certain video editing programs available to typical consumers or professional video editors that may be able to turn the frames to the correct orientation after the video is recorded and before playing the video. This is often cumbersome and time consuming requiring the correction frame by frame, and may be expensive for the extra program.

To resolve these issues more efficiently, the present method and system proposes a post-capture, pre-render automatic rotation to fix the orientation of the video frames by using orientation information recorded during the recording of the video. Thus, the device orientation information or indicator may be stored for multiple frames in a video sequence, and in one form, for each frame in the video sequence. When the device orientation indicator is stored for every frame in a given video, the system will know if and when a user changed the orientation of the recording device during video recording, and can rotate the frames appropriately during video playback (before a frame is to be displayed) based on the user's viewing orientation. This results in a better user experience when viewing videos that have been captured on the device and that have been rotated during image capture.

Referring to FIG. 3, process 300 is provided for a method and system of rotation of video frames for displaying a video. In the illustrated implementation, process 300 may include one or more operations, functions or actions 302 to 306 numbered evenly. By way of non-limiting example, process 300 may be described herein with reference to example image processing systems 400 or 1000 of FIG. 4 or 10 respectively, and where relevant.

Process 300 may include "obtain frames of a video sequence and a plurality of device orientation indicators each associated with a different frame of the video sequence and that indicate an orientation of the frame while the frame was recorded" 302. Particularly, frames of a video sequence are obtained with individual device orientation indicators where single frames have an indicator and, in one form, each frame in the video sequence may have its own indicator. The indicators indicate whether the frame was recorded in a device orientation that is either a landscape mode or a portrait mode. When every frame has an indicator, or at least close to every frame, it is possible to determine the precise frame in which the device orientation was switched from one device orientation to the other device orientation during recording. The details are provided below.

The process 300 also may include "determine a view orientation of the video sequence indicating an orientation of a device using, or to be used, to display the video sequence" 304. This may include monitoring the view orientation of the device playing the video sequence so that the view orientation of multiple, or each, frame of the video sequence is known. This is determined by obtaining signals from orientation sensors on the device playing the video and as explained below, and converting the signal into values that can be compared to the device orientation indicators. Many other details are provided below.

Process 300 then may include "determine a frame of the video sequence is to be rotated when the device orientation of the frame is different than the view orientation, and to display both rotated and non-rotated frames of the video sequence according to the view orientation" 306. Particularly, this operation may include comparing a bit representing the view orientation to a bit representing the device orientation indicator, and when there is a mismatch, the system rotates the image of the frame. This will result in a video sequence where all the frames are in the proper view orientation where the top of the image is at the top of the view orientation regardless of whether the frame was recorded in landscape or portrait orientation thereby at least eliminating the annoying occurrence of changing orientations of the images while viewing a video in a fixed view orientation. More details are explained below.

While these operations may provide a better viewing experience since the view orientation of the frames will not change, the present method and system provides other features that raise the quality of the viewing experience even further. One such feature is the formatting of the image of the rotated frame so that it is appears more continuous with the images of the surrounding non-rotated frames. This may be accomplished by using object detection and/or multi-frame tracking to better ensure that main objects of the frames, and their locations in the frames, are consistent throughout the video over both non-rotated and rotated frames. By other features, the margins of the rotated frames, formed by rotating the frames without resizing the frames for the new orientation, may be treated to provide a more pleasant viewing experience as well. This may include extending the visible part of the image of the rotated frame onto the margins to fill an entire view orientation frame with an image as with the non-rotated frames. Otherwise, the margins may be set apart with background color or luminance. To avoid flashes of the margins, similarly sized margins may be placed on all frames whether rotated or not to provide the same image size for the entire video sequence. The frame rotating system may or may not provide these features as selectable options to a user.

Figure 4:
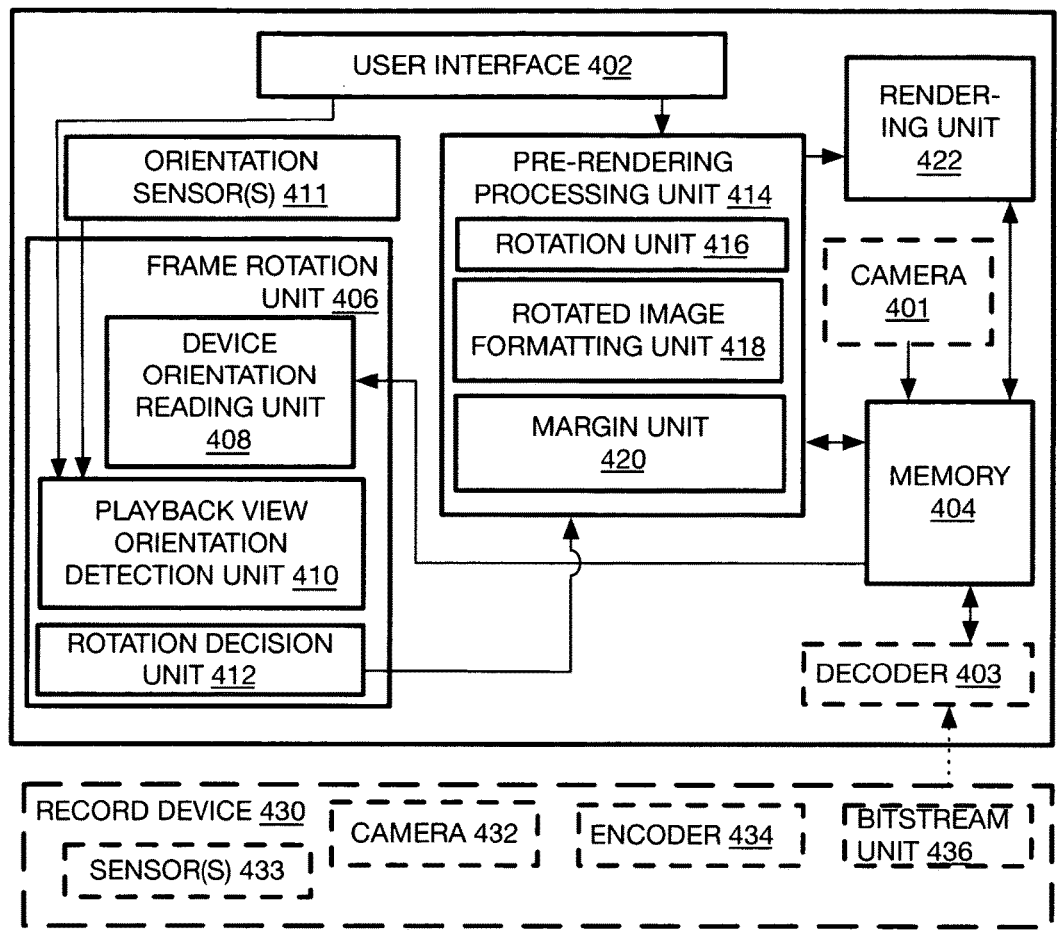
FIG. 4 is a schematic diagram of an image processing device in accordance with the implementations herein.

Referring to FIG. 4, an example image processing device 400, which may be a video playback device, may be used to implement the video frame rotation methods described herein. The image processing device 400 at least has the capability to prepare the video frames for rendering, and may be the device that displays the video. The image processing device may or may not be the device that also recorded the video in the first place with a camera 401 for example, and provided the frames with the individual device orientation indicators and stored in at least one memory 404 as described herein. Alternatively, a separate video recording device 430 may be provided as a smart phone, tablet, computer, web cam, video camera, and so forth, and may have a camera or imaging device 432 that captures images or frames, an encoder 434 to encode the image data, orientation sensor(s) 433 to obtain a signal and/or digital indicator values that indicate the device orientation while recording the frames, which then may be encode as well, and a bit stream unit that packs the image data and the device orientation indicators into the bitstream for transmission to a decoder 403 at the image processing unit 400 to place the image data and device orientation indicators in memory 404.

The image processing unit 400 may have an interface 402 to obtain preferences of a user when such selections are available as well as to determine the view orientation of the device playing the video. At least one memory 404 also may be provided to store the image data of the frames as well as the indicators mentioned herein. This data may be obtained relatively directly after capture when the recording device and the viewing device are the same, but could also be after decoding of the data on a separate display device where the indicators were provided in the metadata for the video sequence or for each frame. A frame rotation unit 406 may be provided to determine which frames are to be rotated, while a pre-rendering processing unit 414 may be provided to perform the frame rotation, formatting of the rotated frames, and margin treatments. A rendering unit 422 may be provided to actually render the video.

In more detail now, the frame rotation unit 406 may have a device orientation reading unit 408 that obtains and reads the device orientation indicators from memory 404. A playback view orientation detection unit 410 may receive the indication of the view orientation to be used for each frame and from one or more orientation sensors 411 described in detail below. The frame rotation unit 406 also may be activated by the user interface when the user has the option to turn the rotation function on or off. The frame rotation unit 406 also may have a rotation decision unit 412 that compares the device orientation indicator to the view orientation for a frame (or the video sequence), and may report that a frame is to be rotated. This may be performed, as indicated below, by having a table of determination indicators that list which frames to rotate, or simply by directing the image data of a frame to be rotated to a frame rotation buffer of just those frames to be rotated. Many variations exist.

The pre-rendering processing unit 414 then may have a rotation unit 416 that retrieves frames to be rotated and performs the frame rotation. A rotated image formatting unit 418 determines which part of the rotated frame is to be placed within the view orientation frame as described elsewhere herein, and trims or removes the parts of the rotated frame that then extend outside of the view orientation frame. A margin unit 420 then treats the margins either to extend the rotated image or set the margins apart as background as described in detail below. This also may include providing margins to non-rotated frames as mentioned below as well. The formatted frames are then stored in the same or different memory ready for retrieval by the rendering unit 422 to perform operations using the image data of the frames to display the video all with the same view orientation.

Figure 5A:
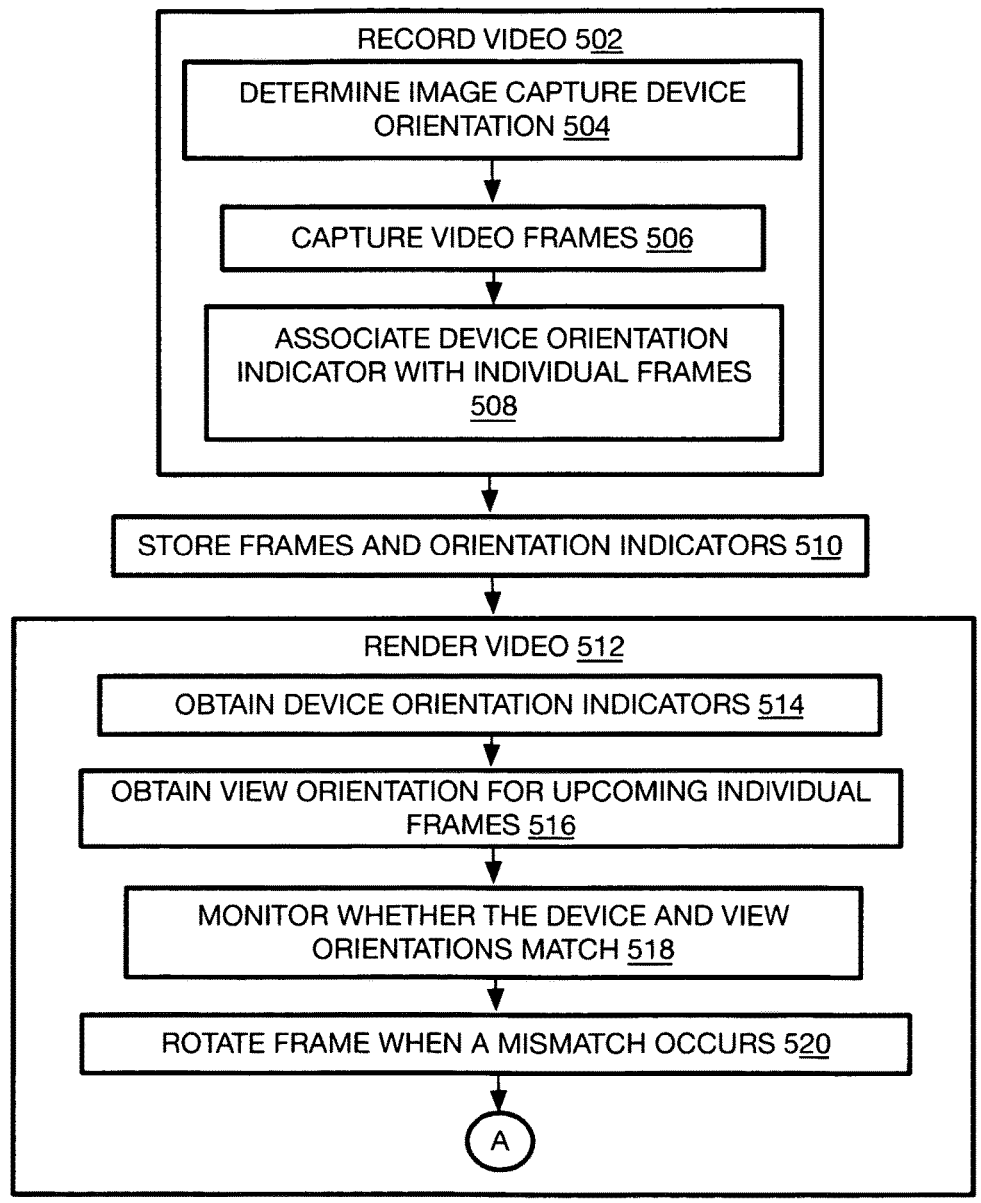
FIGS. 5A-5B is a detailed flow chart of a video frame rotation process for playing the video in accordance with the implementations herein.
Figure 5B:
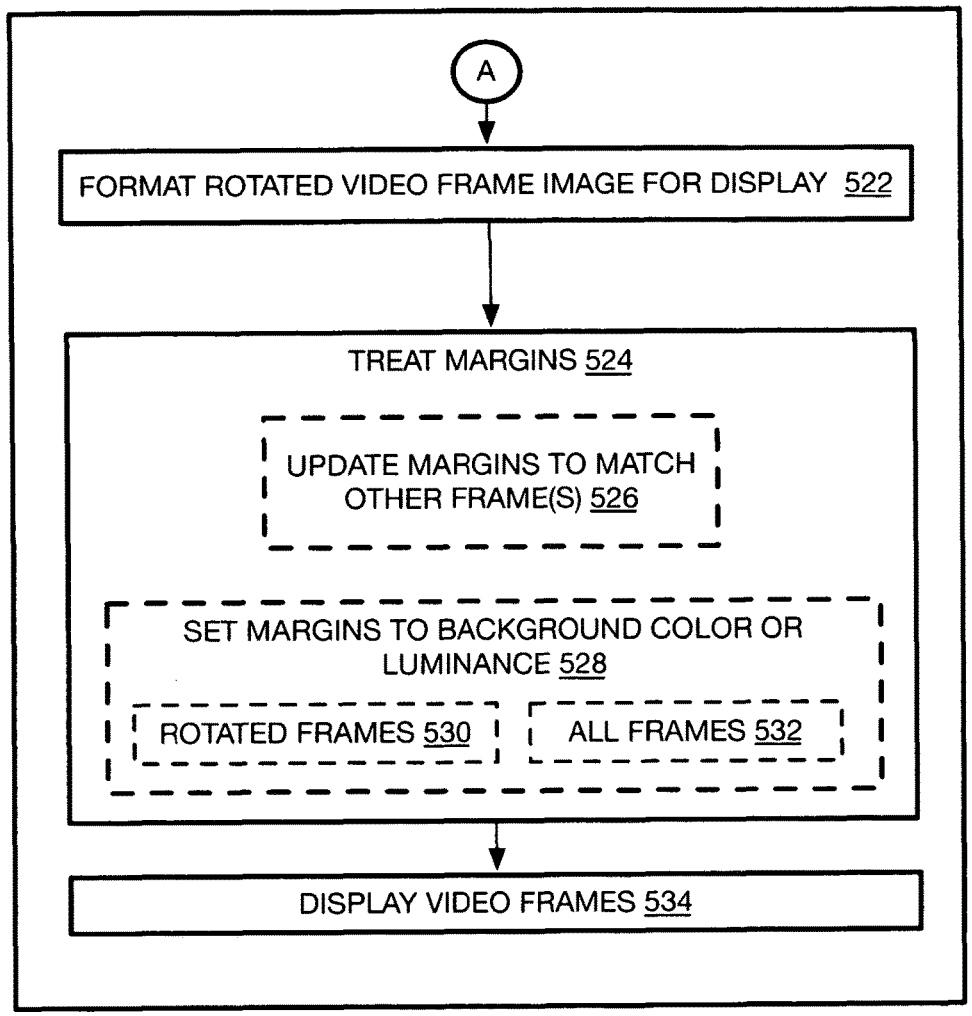

Referring to FIGS. 5A-5B, a process 500 is provided for a method and system of rotation of video frames for playing a video. In the illustrated implementation, process 500 may include one or more operations, functions or actions 502 to 534 numbered evenly. By way of non-limiting example, process 500 may be described herein with reference to example image processing systems 400 or 1000 of FIG. 4 or 10 respectively, and where relevant.

Process 500 may include "record video" 502. Thus, upon a user activation or other automatic activation, recording of video frames may be initiated on an image recording device or video camera, and that captures raw image data including chroma and luminance pixel values for images of pixels as well as other data.

Once activated, this operation may include "determine image capture device orientation" 504, and precisely the orientation, and changes in orientation, while the device is recording. This may be obtained from one or more sensors on the device such as an accelerometer, magnetometer, and/or gyroscope. A signal or digital listing is provided that shows the orientation of the device while a clock is running, and that can be compared to the timestamps of the frames for example. The operation and data obtained from these sensors are known, and the details of generating an orientation determination need not be described here.

The recording operation also may include "capture video frames" 506. Thus, the raw image data may be divided into frames in the raw data bitstream, by vertical blank for example, and from a camera sensor and to be pre-processed and stored, and either prepared for (1) display or (2) encoding and transmission. Pre-processing of raw image data could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth. Each frame may be provided a capture timestamp to determine when the frame was captured.

The recording operation also may include "associate device orientation indicator with individual frames" 508. Thus, the orientation determinations are matched with frames with the same (or sufficiently similar as within a set margin) timestamp or clock value, and may be in the form of a bit that is placed in a memory of the recording device when the same device is to play the video as well, or placed in the metadata of individual, or each, frame when the video is to be transmitted to another device for rendering. The bit may be one value (0 or 1) when the orientation is landscape and the other value (0 or 1) when the orientation is portrait. Thus, the orientation of individual frames are determined so that each frame may receive a different orientation. All orientations of the frames of a single video sequence are permitted to differ from frame to frame and may not necessarily be the same (although the orientations could be).

While providing a device orientation indicator for each frame is disclosed herein, it will be understood that many of the operations herein are still applicable when less than all frames receive a device orientation indicator as long as a sufficient number of frames throughout the video sequence have a device orientation indicator. By one form, the first and/or last frame may not have an indicator for example. Otherwise, the device orientation indicator may be provided in intervals such as every other frame, and so forth. The fewer frames with a device orientation indicator, however, the greater the likelihood that a user will notice a frame that is of the wrong orientation, and even a single frame of the wrong orientation could be noticeable.

Also, it will be understood that it may be possible that more than just two orientations are available, such as some intermediate diagonal orientation, which may be indicated by more than 1 bit as needed.

By one form, the device orientation indicator may be placed in the metadata of each frame, such as with the frame headers when the frames are to be encoded and transmitted to a decoder before the video is to be displayed. The format for the device orientation indicator may be arranged by using metadata strategies and techniques that embed per frame data into a bitstream (see for example, https://en.wikipedia.org/wiki/Audio_Video_Interleave) to embed metadata into video, which is incorporated herein. Alternatively, metadata can also be added into video streams depending on the video or container format standard. This may include User-Data packets in MPEG2-PS (see for example, https://www.uic.edu/classes/ece/ece434/chapter_file/chapter7.htm) and Auxiliary, User, and/or Private Data streams in MPEG2-TS (see for example, https://en.wikipedia.org/wiki/MPEG-_transport_stream). Per frame metadata (Frame number+0 or 1 indicating orientation) also may be added using XMP files (see for example, https://en.wikipedia.org/wiki/Extensible_Metadata_Platform) which forms part of the container—as in MP4 and similar standards (see for example, https://en.wikipedia.org/wiki/MPEG-4_Part_14#Metadata). Other methods such as steganography and other data embedding/hiding also may be applied. Applicant incorporates the articles of the websites recited herein for the information those websites contain up to the date of the filing of this patent application.

Alternatively, the device orientation indicators all may be located in the video sequence header that would provide a list of device orientations and for each or individual frames of a video sequence. In one form, there may be a beginning frame with an initial device orientation, and thereafter, just the transition frames that show a switch from one orientation to another are listed.

Thereafter, the process 500 may include "store frames and device orientation indicators" 510. Particularly, this may include storing image data of the frames of the video sequence and that may be used to display the frames during playing of the video sequence (also referred to herein as rendering). Thus, the image data may be raw or pre-processed image data whether ready for encoding or immediate display. Otherwise, the image data may be compressed or encoded image data ready to be transmitted to another device for display, or already decompressed or decoded image data ready for rendering at another device. The device orientation indicators may be stored as a table or other convenient form that lists the frame number (such as a timestamp) and the orientation indicator value (0 or 1). Otherwise, the listing may include an initial orientation at an initial frame, and then merely list the transition frame numbers (or other identification of the frame).

Turning now to the playing of the video sequence and display of the frames, the device playing the video may be the device that recorded the video. Thus, the display of the video may be on the same smartphone, tablet, or video camera that recorded the video in the first place. In this case, the stored video frames may be in a pre-processed, refined, and enhanced form ready for rendering without other coding. In contrast, when the display of the video is to be on a separate device from the device that recorded the video, the image data of the video frames may have been encoded (with the device orientation indicators in the frame metadata), transmitted to the device to play the video, and then decoded, and otherwise refined or enhanced for subsequent display of the video.

Preliminarily, the auto rotate option could be provided as a fixed feature or it may be a setting to be activated by a user based on the user's preferences. Thus, by one example, a user may be given a choice between always rotate frames with an incorrect orientation or to be provided a notice that indicates to the user via a suitable user interface (UI) such as UI 402 (FIG. 4) that rotation may be necessary for a particular video sequence (such as by looking at the stored device orientation indicators), and then provide the user the option to rotate the frames in the video sequence or not. There is no limit to the type of UI involved as long as the notice and options can be provided to a user and the preference of the user can be obtained.

Process 500 then may include "render video" 512, and this may include performing the operations to determine whether a frame needs to be rotated, performing the rotation, formatting the rotated frame and any margins created due to the rotation, and then displaying the video sequence. In more detail, this may include "obtain device orientation indicators" 514, and as mentioned, the device orientation indicators may be obtained from a memory as needed and may be identifiable by frame, such as by a frame timestamp, which could be the presentation time stamp (PTS) or other number.

Process 500 may include "obtain view orientation for upcoming frames" 516. Particularly, this operation includes obtaining the current view orientation as indicated by orientation sensors on the device being used to display the video sequence. The sensors may include known accelerometers, magnetometers, and/or gyroscopes that provide a signal to indicate the current view orientation of the device. The view orientation may be monitored constantly while the video sequence is playing in order to detect the exact moment that the view orientation is switched. Otherwise, the view orientation may be monitored (or sampled) at intervals that are sufficiently small so that any mismatch is still not noticeable to the user. The view orientations from signals of the sensors may be converted into bit values to be compared to the bit values of the device orientations.

Process 500 may include "monitor whether the device and view orientations match" 518. Specifically, this may include determining a frame of the video sequence is to be rotated when the device orientation (during recording) of the frame is different than the view orientation on the device to be displaying the video sequence. The comparison may occur before a frame is to be displayed, and with sufficient time to perform frame rotation processing before the frame is displayed, but close enough to the display time such that it can be safely assumed that a typical user cannot change the orientation of the device playing the video before the frame is actually displayed. Thus, the indicator value is compared to a value of the view orientation (such as 0 and 1), and when the values are not the same, the frame is to be rotated.

Process 500 may include "rotate frame when a mismatch occurs" 520, and more specifically, before the frame is displayed. Thus, the system, such as a pre-rendering processing unit, receives an indication that a frame is to be rotated and retrieves the frame from a memory, or may simply retrieve the next frame from a buffer that only holds frames to be rotated. The frame is then rotated so that the pixel positions of the image data are transposed to match the view orientation so that a landscape orientation is switched to a portrait orientation or vice versa. This occurs at least before the frame is handed over to a rendering unit for the rendering.

Once a decision has been made to rotate the frame, it becomes necessary to determine how best to render the frame since the frame was captured with the device in another orientation and is actually a frame with a different aspect ratio. This situation provides a number of possible options. First, the rotated frame could be reduced in size so that the entire rotated frame fits into the screen in the view orientation. Most of the time, however, this will be unacceptable because it will result in the frame being too small for a user to clearly see the contents of the rotated frame. It also may cause an irritating change in the position of the contents of the video between the rotated frames and the non-rotated frames.

Instead, the original size of the rotated frame is maintained since the content of the rotated image then will be the same or similar size to the content of at least the non-rotated frames very close to the rotated frame. Since the size of the rotated frame is maintained, when the frame is rotated, the entire rotated frame will not fit on the view orientation. Thus, one decision that must be made is to determine which part of the rotated frame should be visible within the view orientation screen, and then format the rotated frame to crop or trim the remainder of the rotated frame that is not to be visible.

Thus, process 500 may include "format rotated video frame image for display" 522. By one form, the system merely uses as much of the bottom, center, or top (or left, center, or right) of the rotated frame that will fit on the screen of the view orientation and depending on the orientations involved. By other forms, the part of the rotated frame to be visible in the screen of the view orientation is optimized by finding overlapping parts of image content with nearby non-rotated frames, and alternatively or additionally, by finding overlapping parts of image content with rotated frames that were already optimized. The system may select the parts by performing object detection and multi-frame tracking to include the main objects of the non-rotated frames in the rotated frames. Such object detection techniques may include image rotation and comparison methods to identify common and different regions, correlation based methods, object identification and tracking methods, and so forth, Once one or more similar objects are found and to be visible on a rotated frame, the rotated frame may be centered about the common object(s), and this may become the center of the rotated frame that is positioned on the screen of the view orientation. Otherwise, the positions of the similar objects on the non-rotated frames may be at least generally matched (if near exact matches are not possible) and on the part of the rotated frame that is to be visible on the screen of the view orientation frame. For example, when a common object is shown near the bottom of the non-rotated frame, the common object may be placed similarly near the bottom of the rotated frame and within the screen of the view orientation. Many other examples exist.

This operation also may include trimming the portions of the rotated image that fall outside of the view orientation frame once it is decided which part of the rotated image is to be visible within the view orientation frame. Those portions of the rotated image outside of the view orientation frame are deleted or removed.

Also, the rotation and placement of the rotated frame from a recorded orientation to a different view orientation without resizing the frames will cause empty margins to form on opposite sides of the rotated frame where no recorded image data exists for the rotated frame. Thus, when a frame is recorded in a landscape view but then viewed in a portrait view, the margins will be above and below the rotated frame image in the screen of the view orientation frame. Likewise, when the frame is recorded in a portrait view but viewed in a landscape view, the margins will be to the left and right of the rotated frame image in the screen of the view orientation frame.

Figure 6:
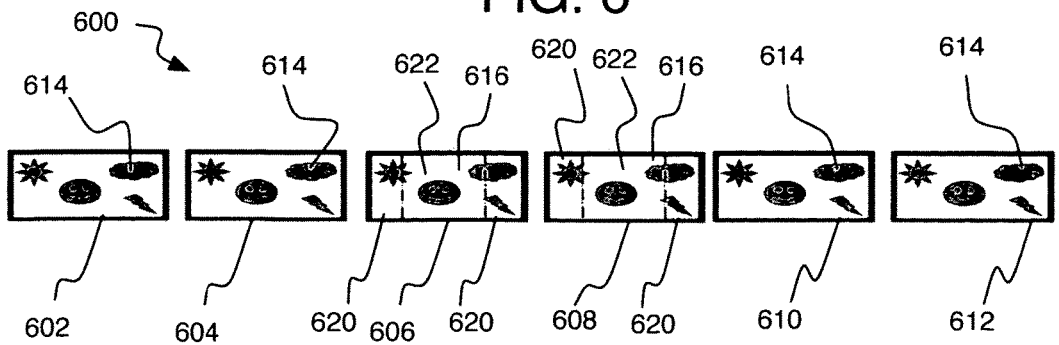
FIG. 6 is an illustration of a video sequence during playing of the video and showing the orientation of the frames and scenes in the frames.

Thus, and referring to FIG. 6, process 500 may include "treat margins" 524. One way to treat the margins of the frames is to "update margins to match other frame(s)" 526. A video sequence 600 is used to illustrate this solution and has frames 602 to 612 numbered evenly where frames 602, 604, 610, and 612 are landscape non-rotated frames that show a scene (or image or content) 614 while frames 606 and 608 are rotated portrait frames that show a scene 616 that is the same as scene 614 except here the part of the scene 616 that is the rotated frame image 622 between the margins 620 is extended onto margins 620 of the rotated frames 606 and 608 by using image data of the non-rotated frames.

Specifically, one way to extend the rotated image 622 is simply to copy the image data from one of the other frames such as the previous frame, which may or may not be limited to the previous non-rotated frame. This may include simply copying an image area of another frame that is equal to the area of the margin of the rotated frame and placing the copied image area onto the margin of the rotated frame. Otherwise, more sophisticated algorithms could be used to determine the image data to be placed in the margins. This may include image data interpolated between two or more other frames, such as a frame just before and just after in display order relative to the rotated frame being modified. The interpolation could include more than two frames such as four or more frames. The interpolation may include any efficient and/or quality increasing combination whether a mean, weighted mean (such as by frame distance to the rotated frame by one example), mode, and so forth.

Alternatively, or additionally, the frames used to obtain image data could be those derived from coding order such that the image data may be derived from those frames used as a reference frame during inter-prediction or intra-prediction during encoding and decoding (if such coding occurred or was simulated) for the present rotated frame to be modified, or could be frames of a certain coding type such as intra-frames (I-frames) or prediction frames (P-frames). This assumes those frames built by motion vectors from too many previous frames might be noticeably inaccurate for use to build the margins now.

To place copied or interpolated image data from other frames and into the margins 620 of the rotated frame 606 or 608, the system may ignore the border fit (or continuity) between the image data placed in the margin on one side of the border and the image data already in the rotated frame image on the other side of the border so that there is not an exact match on the border between the two areas. This assumes that the fit will be sufficiently close for human eyes. Instead, color, luminance, and/or shape matching algorithms may be applied to find a best match between the image data of the rotated frame and the other frame being used to provide better continuity between the margins 620 and the rotated frame image 622.

Figure 7:
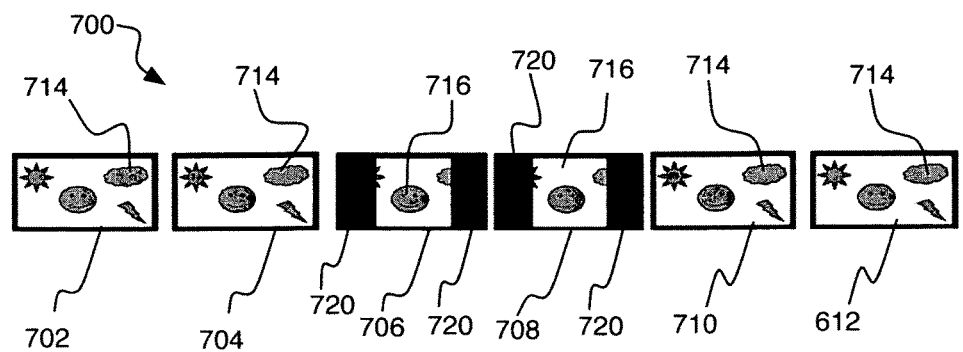
FIG. 7 is an illustration of another video sequence during playing of the video and showing the orientation of the frames and scenes in the frames.

Referring to FIG. 7, the process 500 may include "set margins to background color or luminance" 528 in order to treat the margins rather than extending the rotated image onto the margins. Particularly, as shown by video sequence 700, setting the margins to background may be applied just to the "rotated frames" 530 rather than all of the frames. Specifically, the video sequence 700 has non-rotated frames 702, 704, 710, and 712 each with the same scene 714, while rotated frames 706 and 708 have rotated scene 716 that is the same content as scene 714, except the rotated scene 716 does not fill the entire landscape view orientation frames 706 and 708, which results in margins 720. Thus, by one example, the margins 720 are maintained on the rotated frames 706 and 608, and are treated with the background treatments.

Example background treatments may include applying all white or all black color uniformly throughout the margins, or 0 luminance for black or 255 luminance for white. This may be the default margin treatment of those treatments available. Since the non-rotated frames do not have margins in this example, the flashes of the margin may be noticeable to a user viewing the video but should be much less disturbing than the change in orientation.

Figure 8:
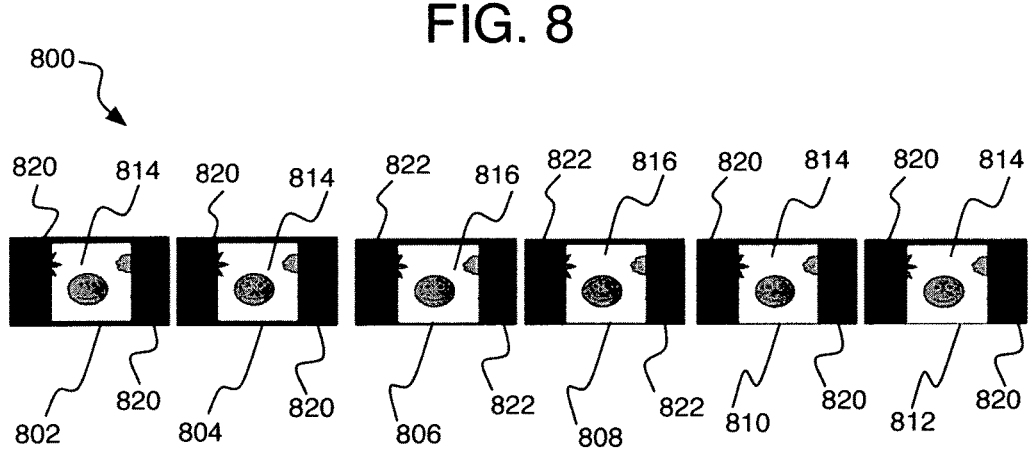
FIG. 8 is an illustration of another video sequence during playing of the video and showing the orientation of the frames and scenes in the frames.

Referring to FIG. 8, as another alternative, background treatment may be applied to the margins of "all frames" 532 rather than just the rotated frames. For example, video sequence 800 has frames 802 to 812 numbered evenly where frames 802, 804, 810, and 812 are non-rotated frames originally recorded in landscape orientation, while frames 806 and 808 are rotated frames originally recorded in portrait orientation and rotated for landscape orientation so that margins 822 are formed on each rotated frame. As mentioned, the margins 822 are formed because the rotated frame was not resized and does not fit the entire width of the landscape orientation view.

For this alternative, an area of the images of the non-rotated frames 802, 804, 810, and 812 that is the same area as the margins 822 is covered and replaced with margins 820 on multiple or all non-rotated frames 802, 804, 810, and 812 so that an image of a uniform size is presented on at least all of the frames near a rotated frame but could be applied to all frames of a video sequence. Thus, when the rotated frames have left and right margins during a landscape view orientation, the non-rotated frames also will be provided with left and right margins, and of the same color and/or luminance as the rotated frames to present a uniform margin over the frames regardless of any change in recording device orientation from frame to frame. The same applies to upper and lower margins formed during a portrait view orientation. This may result in a more pleasing viewing experience for a user since there are no changes in image size and orientation while viewing the video sequence that is playing.

The margin treatments are applied in such a way that it is assumed that the rotated image of a rotated frame will be centered in the view orientation frame to form two opposite margins, but this need not always be so. The rotated image may be placed at one end of the view orientation (or other position) instead, so that either a margin only exists on one side of the image or the two margins on a frame are unequal. In these cases, it will be understood that much of the formatting and margin treatment described herein still applies with adjustments made for unequal margin areas while still attempting to provide continuity and uniformity throughout the frames.

One of the image formatting techniques and one of the margin treatment techniques may be the only methods provided by the frame rotation system. Alternatively, a system may be capable of providing a number of these options, and by one form, a user may be able to select which of these formatting and margin treating options to use. In these cases, one of the options for each (image formatting and margin treatment) may be set as the default. Such a selection could be provided on a setup screen on a user interface for example although many other options for an interface or obtaining such selections are possible.

Process 500 may include "display video frames" 534. Once the pre-rendering processing that formats and treats the rotated frames (and non-rotated frames when relevant) is complete, the frames may be provided to a display device for rendering or storage for later rendering. As mentioned, the display may be provided on the same device that recorded the video or may be performed on another device (where the frames were encoded and then decoded for transmission). Many alternatives are possible.

Figure 9:
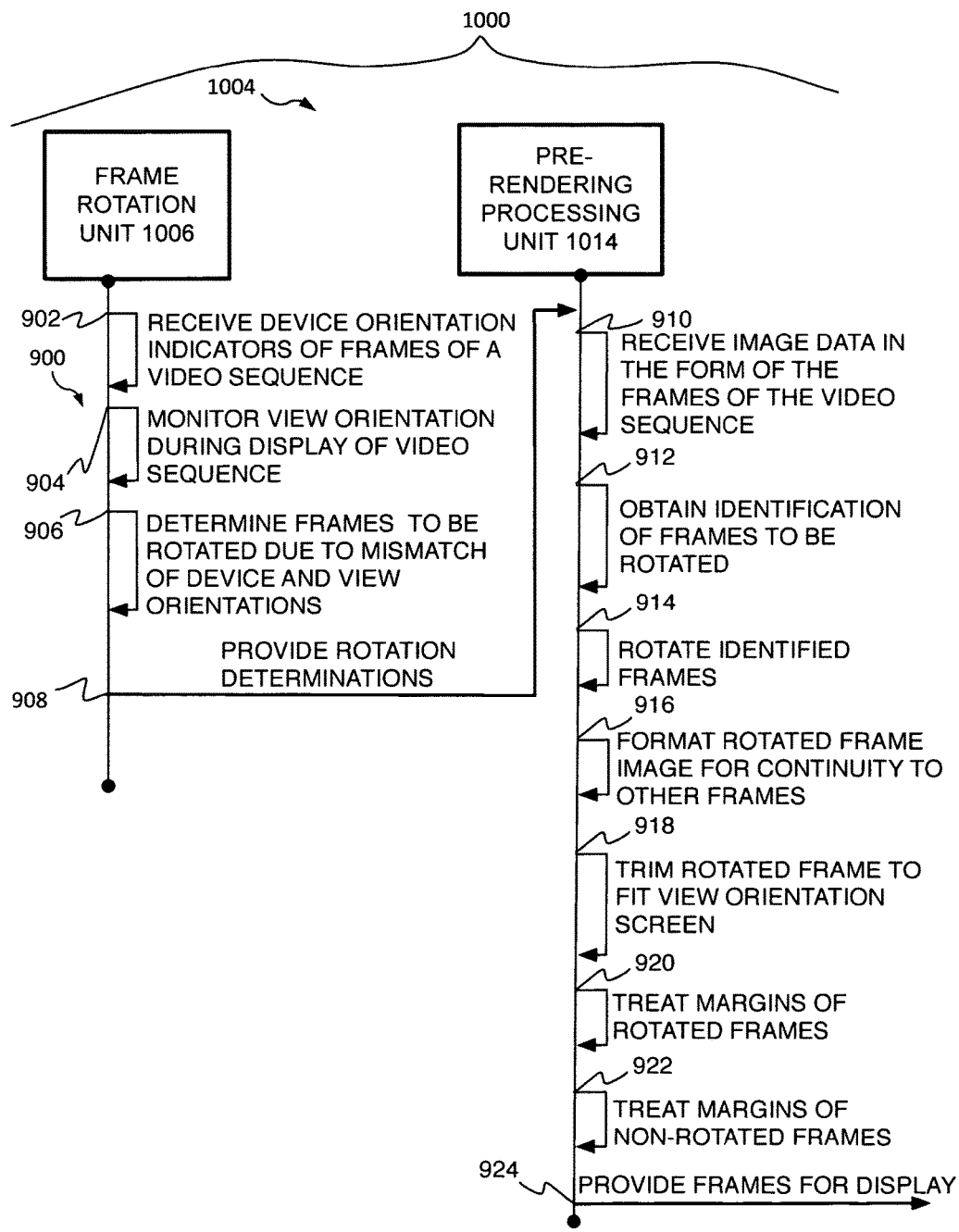
FIG. 9 is a diagram of the video frame rotation method in operation of an example system described herein.

Referring to FIG. 9, process 900 illustrates the operation of a sample image processing system 1000 that performs rotation of video frames to display a video in accordance with at least some implementations of the present disclosure. In more detail, in the illustrated form, process 900 may include one or more operations, functions or actions as illustrated by one or more of actions 902 to 924 numbered evenly. By way of non-limiting example, process 900 will be described herein with reference to FIG. 10. Specifically, system 1000 includes logic units or modules 1004. The logic modules 1004 may include a frame rotation unit 1006 with a device orientation indicator reading unit 1008, a playback view orientation detection unit 1010, and a rotation decision unit 1012. The logic units 1004 also may include a pre-rendering processing unit 1014 and a rendering unit 1016. The operation of the system may proceed as follows.

Process 900 may include "receive device orientation indicators of frames of a video sequence" 902, and as described above with processes 300 and 500, orientation sensors may provide a signal converted into digital values that indicate the orientation of individual frames during recording. The system may provide the indicators in a memory when the device playing the video is the same device that recorded the video. When the video is to be encoded and transmitted from a separate device, the indicators may be placed in the metadata for each frame. The indicators indicate whether the frame was recorded in landscape mode or portrait mode. This may be a single bit (0 or 1) in the metadata. The indicators may be obtained from the memory in the device that is to display the video for example, and may or may not be the same memory that stores the frame image data. By one form, each frame in the video sequence has an indicator although it may be provided in some interval instead, as long as there are multiple indicators placed throughout the video sequence so that it can be determined that the video has switched recording device orientations in a timely manner to reduce noticeable annoying changes in image orientation during the viewing of the video.

Process 900 may include "monitor view orientation during display of video sequence" 904. Particularly, sensors may be used to monitor the orientation of the device playing the video. The sensors may provide a signal that can be transformed into per-frame values that show the orientation of each frame as it is being viewed, or more accurately, the orientation that a frame is about to be viewed in, and at least a number of frames ahead in time to perform the rotation processing. This also may involve providing a bit value that indicates the view orientation, whether landscape or portrait, and may be held in a memory for one or more frames, such as in a table. Otherwise, once a first frame is identified as having a certain view orientation, only the transition frames with a switch from one orientation to another may be noted so that the view orientation of any frame may be known simply comparing the timestamp of the frame to the time stamps of the first and transition frames.

Process 900 may include "determine frames to be rotated due to a mismatch of device and view orientations" 906, and as described above, the value of the device orientation indicator and the value of the view orientation are compared, and if the values are not the same, then the frame is to be rotated. Specifically, this may refer to the indicator bits being accessible to the rotation unit or the pre-rendering processing unit that may receive a bit for the view orientation (0 or 1) and a bit for the device orientation indicator (also 0 or 1), and when the two bits are different, the frame is to be rotated to the view orientation. This comparison may be performed in other ways as well.

Process 900 may include "provide rotation determinations" 908. Thus, the determinations (in the form of some indicator value for example) may be provided to a pre-rendering processing unit that performs the rotations of the frames if such a unit does not make the determinations itself. Alternatively, the frame already may have been placed in a frame rotation buffer, and the unit need only retrieve the frame from the buffer rather than look up any rotation determination indicator.

Process 900 may include "receive image data in the form of the frames of the video sequence" 910, or in other words, image data that is otherwise ready for rendering. Thus, this may include raw data that has already been refined and/or enhanced by pre- and post-processing techniques, and either for direct display of the video on the device that performed the recording, or for encoding, transmission, and then decoding at a separate device that will display the video. The pre-rendering processing unit may obtain all frames when some of the rotation processing (such as image treatment or rotated image formatting) applies to, or uses, all frames, or other processing operations are to be performed by this unit in addition to frame rotation tasks. Otherwise, the unit may retrieve only those frames involved in frame rotation. As mentioned, once it is determined that a frame is to be rotated, the frames to be rotated may be placed into the frame rotation buffer for rotation processing, or may be obtained from other memory (without a separate buffer) especially when non-rotated frames are to be used or modified as well, as explained herein.

Process 900 then may include "obtain identification of frames to be rotated" 912. When the indicator comparison and identification of the rotated frames has already been performed, this operation may include obtaining an indicator (such as a bit) that indicates a frame is to be rotated, and the frame can then be retrieved from any memory. As mentioned, the frame already may have been placed in a frame rotation buffer, and the unit need only retrieve the frame from the buffer rather than look up any rotation determination indicator in this case. As yet another alternative, the pre-rendering processing unit may make its own determination by comparing the device orientation indicator to the view orientation indicator, and then retrieving the frame from any memory.

Process 900 may include "rotate identified frames" 914, and generally as mentioned above, the frames may be rotated by known methods that transpose the pixel locations of the image data of a frame.

Process 900 may include "format rotated frame image for continuity to other frames" 916. Thus, as already described above, object detection, tracking, or other techniques may be used to determine which parts or objects of the rotated frame match the parts or objects of the non-rotated frames, and these parts or objects of the rotated image are placed within the view orientation frame, and in similar positions to that on the non-rotated frames, so that the images appear more continuous across non-rotated and rotated frames in the video sequence for a better viewing experience.

Once it is determined which part of the image of the rotated frame is to be placed in the view orientation frame, process 900 may include "trim rotated frame to fit view orientation screen" 918, and as explained above, the parts of the rotated image that extend outside of the view orientation frame at this point are removed.

Process 900 then may include "treat margins of rotated frames" 920, and as mentioned above, the margins that are formed by rotating a frame from device orientation to the view orientation without resizing the frame to fill the entire view orientation frame and while maintaining the objects in the image of the rotated frame the same general size as that in the non-rotated frames. Thus, by one form, the image may be extended onto the margins to fill the view orientation frame, and this may be accomplished by copying corresponding image data from other frames, such as a previous frame, or computing some interpolated (or other combination) image data by using nearby or key frames. Alternatively, the margins of the rotated frames may be maintained as background with a background color or luminance, as described above.

Also, mentioned above, process 900 may include "treat margins of non-rotated frames" 922 as another alternative.

Thus, when the margins of the rotated frames are set as background, margins of the same size are placed on the non-rotated frames to provide an image that is the same size on both rotated and non-rotated frames thereby providing a better user experience. This may be provided for an entire video sequence or just parts of the video sequence near the rotated frames, such as within the same continuous scene or even smaller sections of the video.

Process 900 may include "provide frames for display" 924. Thus, once the frames are rotated so that all frames present the same view orientation, and the formatting of the frames and treatment of the margins is complete, the frames may be provided to a display or rendering unit for rendering. The frames also may be placed in storage for subsequent display.

In addition, any one or more of the operations of FIGS. 3, 5, and 9 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
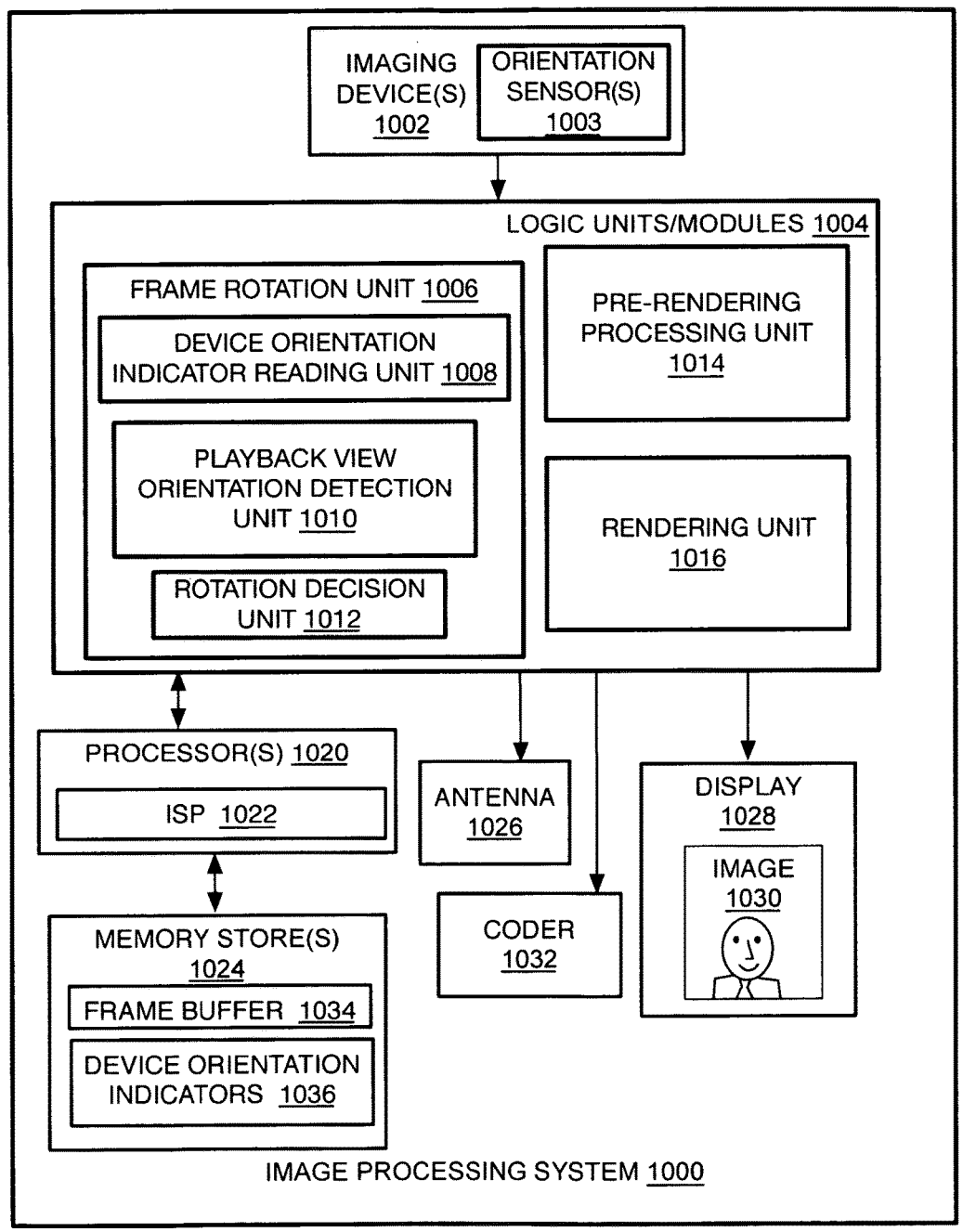
FIG. 10 is an illustrative diagram of an example system.

Referring to FIG. 10, an example image processing system 1000 is arranged in accordance with at least some implementations of the present disclosure. In various implementations, the example image processing system 1000 may have an imaging device 1002 to form or receive captured image data. This can be implemented in various ways. Thus, in one form, the image processing system 1000 may be one or more digital cameras or other image capture devices, and imaging device 1002, in this case, may be the camera hardware and camera sensor software, module, or component. In other examples, imaging processing system 1000 may have an imaging device 1002 that includes or may be one or more cameras, and logic modules 1004 may communicate remotely with, or otherwise may be communicatively coupled to, the imaging device 1002 for further processing of the image data.

Thus, image processing device 1000 may be a smartphone, tablet, laptop, or other mobile device. Otherwise, whether or not device 1000 may be the smartphone, tablet, or other device, it is a device or computer that at least performs the frame rotation processing and may not have a camera to capture the frames and the display to render the frames, both of which could be performed remotely.

In any of these cases, when such technology includes a camera, the camera may be a digital camera system, a dedicated camera device, or an imaging phone or tablet, whether a still picture or video camera, camera that provides a preview screen, or some combination of these. Thus, in one form, imaging device 1002 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1002 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

The imaging device 1002 also may have or be disposed near or with orientation sensors 1003. These sensors may include an accelerometer, magnetometer, and/or gyroscope, and so forth that indicates an orientation of the imaging device 1002. As explained above, the sensors may provide a signal that indicates the orientation of the imaging device 1002, and in turn the image processing system 1000 when relevant. The signal may be transformed to digital values that indicate the orientation of individual frames while the frames were recorded. The sensors also may indicated the orientation of the image processing system 1000 when displaying the video when relevant and as explained herein as well.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1002 may be provided with an eye tracking camera.

In the illustrated example and relevant here, the logic modules 1004 may include a frame rotation unit 1006 with a device orientation indicator reading unit 1008, a playback view orientation detection unit 1010, and a rotation decision unit 1012. The logic units 1004 also may include a pre-rendering processing unit 1014 and a rendering unit 1016. These units may use a rotation frame buffer 1034 that holds frames to be rotated, and device orientation indicators 1036 at a memory 1024. The operation of these units are already described above. In these examples, the logic modules 1004 may be considered to be separate from the imaging device or may be considered to be part of the imaging device.

The image processing system 1000 may have one or more processors 1020 which may include a dedicated image signal processor (ISP) 1022 such as the Intel Atom, memory stores 1024, one or more displays 1028 to provide images 1030, a coder 1032, and antenna 1026. In one example implementation, the image processing system 1000 may have the display 1028, at least one processor 1020 communicatively coupled to the display, and at least one memory 1024 communicatively coupled to the processor, and as mentioned, may hold a rotation frame buffer 1034 and device orientation indicators 1036. A coder 1032, which may be an encoder, decoder, or both, also may be provided. As an encoder 1032 and antenna 1034 may be provided to compress the modified image date for transmission to other devices that may display or store the image. It will be understood that the image processing system 1000 also may include a decoder (or encoder 1032 may include a decoder) to receive and decode image data for processing by the system 1000. Otherwise, the processed image 1030 may be displayed on display 1028 or stored in memory 1024. As illustrated, any of these components may be capable of communication with one another and/or communication with portions of logic modules 1004 and/or imaging device 1002. Thus, processors 1020 may be communicatively coupled to both the image device 1002 and the logic modules 1004 for operating those components. By one approach, although image processing system 1000, as shown in FIG. 10, may include one particular set of blocks or actions associated with particular components or modules, these blocks or actions may be associated with different components or modules than the particular component or module illustrated here.

Figure 11:
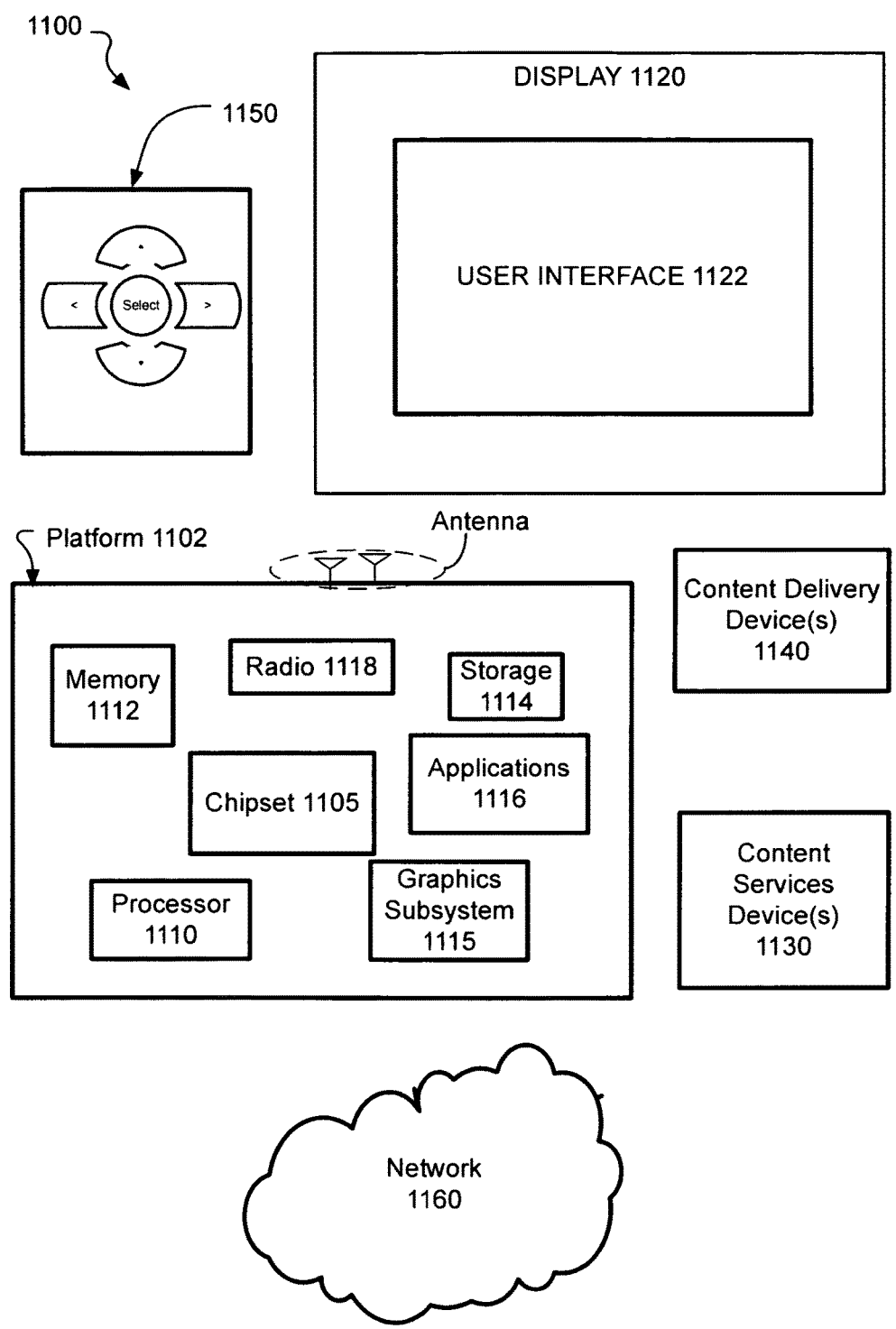
FIG. 11 is an illustrative diagram of another example system.

Referring to FIG. 11, an example system 1100 in accordance with the present disclosure operates one or more aspects of the image processing system described herein. It will be understood from the nature of the system components described below that such components may be associated with, or used to operate, certain part or parts of the image processing system 1000 described above. In various implementations, system 1100 may be a media system although system 1100 is not limited to this context. For example, system 1100 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
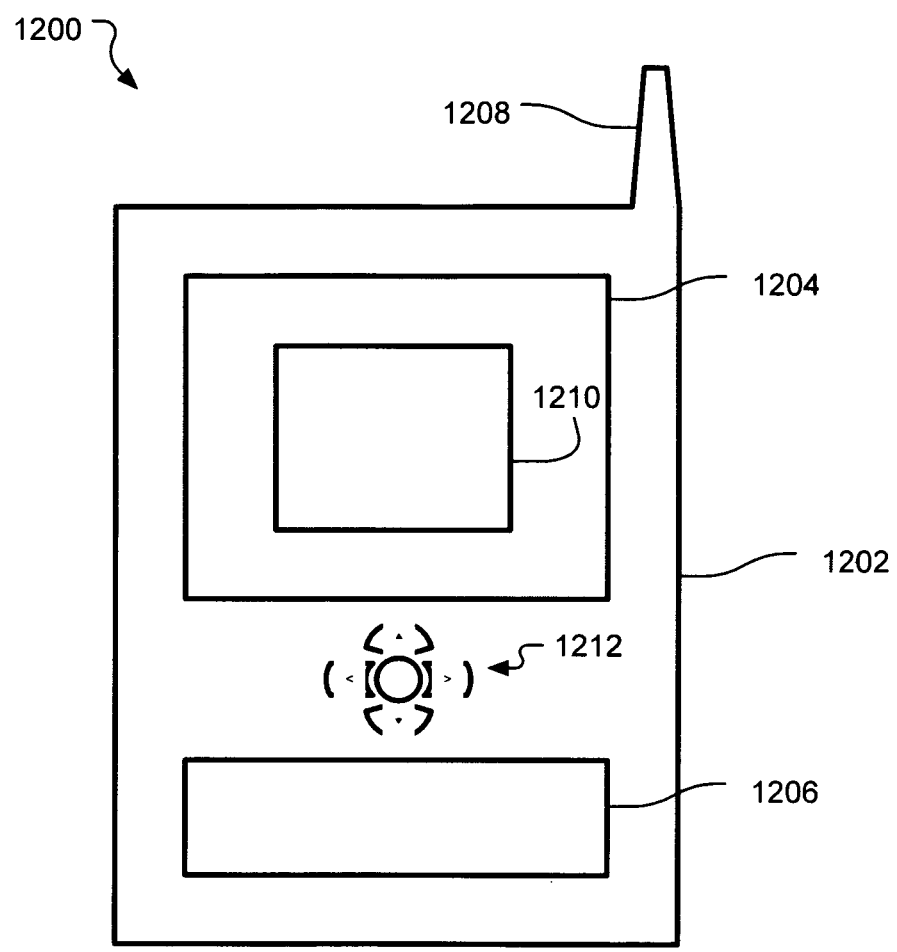
FIG. 12 illustrates another example device, all arranged in accordance with at least some implementations of the present disclosure.

Referring to FIG. 12, a small form factor device 1200 is one example of the varying physical styles or form factors in which system 1000 and/or 1100 may be embodied. By this approach, device 1200 may be implemented as a mobile computing device having wireless capabilities, a screen for displaying video, and one or more cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing 1202, a display 1204 including a screen 1210, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of rotation of video frames for displaying a video comprises obtaining frames of a video sequence and a plurality of device orientation indicators each associated with a different frame of the video sequence and that indicate an orientation of the frame while the frame was recorded; determining a view orientation of the video sequence indicating an orientation of a device using, or to be used, to display the video sequence; and determining a frame of the video sequence is to be rotated when the device orientation of the frame is different than the view orientation, and to display both rotated and non-rotated frames of the video sequence according to the view orientation.

By another implementation, this method may comprise that the available orientations are landscape and portrait; wherein the device orientation indicator is a single bit indicating whether the device orientation during recording of a frame is in a landscape orientation or portrait orientation; wherein the individual device orientation indicators are permitted to differ from frame to frame in the video sequence; and wherein the rotated frames provide an image that is smaller than an entire view area of a frame so that a margin is formed at the unoccupied portion(s) of the view area.

The method may comprise at least one of: (1) providing the margin with at least one of a background color and background luminance, and providing a margin to non-rotated frames so that the rotated frames and non-rotated frames show images of substantially the same size; and (2) extending the scene of at least one rotated image onto the margins so that an image substantially fills the view area; using the image data of at least one other frame of the video sequence to determine the image data to be used to extend the rotated frame image onto the margin(s) of the frame; and using interpolation from a plurality of other frames in the video sequence to determine the image data to extend the rotated frame image onto the margin(s) of the frame.

The method also may comprise retrieving the device orientation indicator from the metadata of individual frames; obtaining the individual device orientation indicators embedded in data transmitted in a bitstream and data respectively associated with individual frames of the video sequence; determining which part of a rotated frame to display in the view orientation when the entire rotated frame will not fit on a screen of a device playing the video sequence at the view orientation, wherein the determining of which part of a rotated frame to display comprises determining an overlap of the rotated frame and at least one other frame in the video sequence wherein the overlap is to be displayed on the rotated frame; and performing at least one of object detection and multi-frame tracking to determine objects on the rotated frame similar to objects on other frames of the video sequence and that should be kept in the part of the rotated frame to be displayed.

By a further implementation, a computer-implemented system of rotation of video frames for displaying a video comprises at least one display; at least one memory; at least one processor communicatively coupled to the display and the memory; and a frame rotation unit operated by the at least one processor and to: obtain frames of a video sequence and a plurality of device orientation indicators each associated with a different frame of the video sequence and that indicate an orientation of the frame while the frame was recorded; determine a view orientation of the video sequence indicating an orientation of a device using, or to be used, to display the video sequence; and determine a frame of the video sequence is to be rotated when the device orientation of the frame is different than the view orientation, and to display both rotated and non-rotated frames of the video sequence according to the view orientation.

The system also may include that wherein the available orientations are landscape and portrait; wherein the device orientation indicator is a single bit indicating whether the device orientation during recording of a frame is in a landscape orientation or portrait orientation; and wherein the individual device orientation indicators are permitted to differ from frame to frame in the video sequence wherein the rotated frames provide an image that is smaller than an entire view area of a frame so that a margin is formed at the unoccupied portion(s) of the view area.

The system comprises a pre-rendering processing unit being arranged to at least one of: (1) provide the margin with at least one of a background color and background luminance, and provide a margin to non-rotated frames so that the rotated frames and non-rotated frames show images of substantially the same size; and (2) extend the scene of at least one rotated image onto the margins so that an image substantially fills the view area; use the image data of at least one other frame of the video sequence to determine the image data to be used to extend the rotated frame image onto the margin(s) of the frame; and use interpolation from a plurality of other frames in the video sequence to determine the image data to extend the rotated frame image onto the margin(s) of the frame.

The frame rotation unit being arranged to: retrieve the device orientation indicator from the metadata of individual frames; obtain the individual device orientation indicators embedded in data transmitted in a bitstream and data respectively associated with individual frames of the video sequence; and the pre-rendering processing unit being arranged to: determine which part of a rotated frame to display in the view orientation when the entire rotated frame will not fit on a screen of a device playing the video sequence at the view orientation, wherein the determining of which part of a rotated frame to display comprises determining an overlap of the rotated frame and at least one other frame in the video sequence wherein the overlap is to be displayed on the rotated frame; and perform at least one of object detection and multi-frame tracking to determine objects on the rotated frame similar to objects on other frames of the video sequence and that should be kept in the part of the rotated frame to be displayed.

As another implementation, a computer-readable medium having stored thereon instructions that when executed cause a computing device to: obtain frames of a video sequence and a plurality of device orientation indicators each associated with a different frame of the video sequence and that indicate an orientation of the frame while the frame was recorded; determine a view orientation of the video sequence indicating an orientation of a device using, or to be used, to display the video sequence; and determine a frame of the video sequence is to be rotated when the device orientation of the frame is different than the view orientation, and to display both rotated and non-rotated frames of the video sequence according to the view orientation.

As another option, the executed instructions cause the computing device to: wherein the available orientations are landscape and portrait; wherein the device orientation indicator is a single bit indicating whether the device orientation during recording of a frame is in a landscape orientation or portrait orientation; wherein the individual device orientation indicators are permitted to differ from frame to frame in the video sequence; wherein the rotated frames provide an image that is smaller than an entire view area of a frame so that a margin is formed at the unoccupied portion(s) of the view area.

The instructions causing the computing device to at least one of: (1) provide the margin with at least one of a background color and background luminance, and provide a margin to non-rotated frames so that the rotated frames and non-rotated frames show images of substantially the same size; and (2) extend the scene of at least one rotated image onto the margins so that an image substantially fills the view area; use the image data of at least one other frame of the video sequence to determine the image data to be used to extend the rotated frame image onto the margin(s) of the frame; and use interpolation from a plurality of other frames in the video sequence to determine the image data to extend the rotated frame image onto the margin(s) of the frame.

The instructions causing the computing device to: retrieve the device orientation indicator from the metadata of individual frames; obtain the individual device orientation indicators embedded in data transmitted in a bitstream and data respectively associated with individual frames of the video sequence; determine which part of a rotated frame to display in the view orientation when the entire rotated frame will not fit on a screen of a device playing the video sequence at the view orientation, wherein the determining of which part of a rotated frame to display comprises determining an overlap of the rotated frame and at least one other frame in the video sequence wherein the overlap is to be displayed on the rotated frame; and perform at least one of object detection and multi-frame tracking to determine objects on the rotated frame similar to objects on other frames of the video sequence and that should be kept in the part of the rotated frame to be displayed.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of rotation of video frames for displaying a video, comprising:
   obtaining frames of a video sequence and a plurality of device orientation indicators each associated with a different frame of the video sequence and that indicate an orientation of the frame while the frame was recorded;
   determining a view orientation of the video sequence indicating an orientation of a device using, or to be used, to display the video sequence; and
   determining a frame of the video sequence is to be rotated when the device orientation of the frame is different than the view orientation, and to display both rotated and non-rotated frames of the video sequence according to the view orientation
   wherein the rotated frames provide an image that is smaller than an entire view area of a frame so that a margin is formed at the unoccupied portion(s) of the view area, and
   wherein the margin is provided with at least one of a background color and background luminance.

2. The method of claim 1 wherein the available orientations are landscape and portrait.

3. The method of claim 1 wherein the individual device orientation indicators are permitted to differ from frame to frame in the video sequence.

4. The method of claim 1 comprising providing a margin to non-rotated frames so that the rotated frames and non-rotated frames show images of substantially the same size.

5. The method of claim 1 comprising extending the scene of at least one rotated image onto the margins so that an image substantially fills the view area.

6. The method of claim 5 comprising using the image data of at least one other frame of the video sequence to determine the image data to be used to extend the rotated frame image onto the margin(s) of the frame.

7. The method of claim 6 comprising using interpolation from a plurality of other frames in the video sequence to determine the image data to extend the rotated frame image onto the margin(s) of the frame.

8. The method of claim 1 comprising obtaining the individual device orientation indicators embedded in data transmitted in a bitstream and data respectively associated with individual frames of the video sequence.

9. The method of claim 1 wherein the device orientation indicator is a single bit indicating whether the device orientation during recording of a frame is in a landscape orientation or portrait orientation.

10. The method of claim 1 comprising determining which part of a rotated frame to display in the view orientation when the entire rotated frame will not fit on a screen of a device playing the video sequence at the view orientation.

11. The method of claim 10 wherein the determining of which part of a rotated frame to display comprises determining an overlap of the rotated frame and at least one other frame in the video sequence wherein the overlap is to be displayed on the rotated frame.

12. The method of claim 10 comprising performing at least one of object detection and multi-frame tracking to determine objects on the rotated frame similar to objects on other frames of the video sequence and that should be kept in the part of the rotated frame to be displayed.

13. The method of claim 1 wherein the available orientations are landscape and portrait;
   wherein the device orientation indicator is a single bit indicating whether the device orientation during recording of a frame is in a landscape orientation or portrait orientation;
   wherein the individual device orientation indicators are permitted to differ from frame to frame in the video sequence
   the method comprising at least one of:
      (1) providing a margin to non-rotated frames so that the rotated frames and non-rotated frames show images of substantially the same size;
      using the image data of at least one other frame of the video sequence to determine the image data to be used to extend the rotated frame image onto the margin(s) of the frame; and
      using interpolation from a plurality of other frames in the video sequence to determine the image data to extend the rotated frame image onto the margin(s) of the frame;
   the method comprising:
   retrieving the device orientation indicator from the metadata of individual frames;
   obtaining the individual device orientation indicators embedded in data transmitted in a bitstream and data respectively associated with individual frames of the video sequence;
   determining which part of a rotated frame to display in the view orientation when the entire rotated frame will not fit on a screen of a device playing the video sequence at the view orientation, wherein the determining of which part of a rotated frame to display comprises determining an overlap of the rotated frame and at least one other frame in the video sequence wherein the overlap is to be displayed on the rotated frame; and
   performing at least one of object detection and multi-frame tracking to determine objects on the rotated frame similar to objects on other frames of the video sequence and that should be kept in the part of the rotated frame to be displayed.

14. A computer-implemented system of rotation of video frames for displaying a video, comprising:
at least one display;
at least one memory;
at least one processor communicatively coupled to the display and the memory; and
a frame rotation unit operated by the at least one processor and to:
obtain frames of a video sequence and a plurality of device orientation indicators each associated with a different frame of the video sequence and that indicate an orientation of the frame while the frame was recorded;
determine a view orientation of the video sequence indicating an orientation of a device using, or to be used, to display the video sequence;
determine a frame of the video sequence is to be rotated when the device orientation of the frame is different than the view orientation, and to display both rotated and non-rotated frames of the video sequence according to the view orientation; and
obtain the individual device orientation indicators embedded in data transmitted in a bitstream and data respectively associated with individual frames of the video sequence,
wherein the individual device orientation indicators are permitted to differ from frame to frame in the video sequence.

15. The system of claim 14 wherein the rotated frames provide an image that is smaller than an entire view area of a frame so that at least one margin is formed at the unoccupied portion(s) of the view area.

16. The system of claim 15 wherein the margin is provided with at least one of a background color and background luminance.

17. The system of claim 15 comprising a pre-rendering processing unit to provide a margin to non-rotated frames so that the rotated frames and non-rotated frames show images of substantially the same size.

18. The system of claim 15 comprising a pre-rendering processing unit to extend the scene of at least one rotated image onto the margins so that an image substantially fills the view area, and uses the image data of at least one other frame of the video sequence to determine the image data to be used to extend the rotated frame image onto the margin(s) of the frame.

19. The system of claim 14 comprising a pre-rendering processing unit to determine which part of a rotated frame to display in the view orientation when the entire rotated frame will not fit on a screen of a device playing the video sequence at the view orientation, and
by determining an overlap of the rotated frame and at least one other frame in the video sequence wherein the overlap is to be displayed on the rotated frame.

20. The system of claim 14 wherein the available orientations are landscape and portrait;
wherein the device orientation indicator is a single bit indicating whether the device orientation during recording of a frame is in a landscape orientation or portrait orientation;
wherein the rotated frames provide an image that is smaller than an entire view area of a frame so that a margin is formed at the unoccupied portion(s) of the view area;
the system comprising a pre-rendering processing unit being arranged to at least one of:

(1) provide the margin with at least one of a background color and background luminance, and provide a margin to non-rotated frames so that the rotated frames and non-rotated frames show images of substantially the same size; and
(2) extend the scene of at least one rotated image onto the margins so that an image substantially fills the view area;
use the image data of at least one other frame of the video sequence to determine the image data to be used to extend the rotated frame image onto the margin(s) of the frame; and
use interpolation from a plurality of other frames in the video sequence to determine the image data to extend the rotated frame image onto the margin(s) of the frame;
the frame rotation unit being arranged to:
retrieve the device orientation indicator from the metadata of individual frames;
and
the pre-rendering processing unit being arranged to:
determine which part of a rotated frame to display in the view orientation when the entire rotated frame will not fit on a screen of a device playing the video sequence at the view orientation, wherein the determining of which part of a rotated frame to display comprises determining an overlap of the rotated frame and at least one other frame in the video sequence wherein the overlap is to be displayed on the rotated frame; and
perform at least one of object detection and multi-frame tracking to determine objects on the rotated frame similar to objects on other frames of the video sequence and that should be kept in the part of the rotated frame to be displayed.

21. A non-transitory computer-readable medium having stored thereon instructions that when executed cause a computing device to:
obtain frames of a video sequence and a plurality of device orientation indicators each associated with a different frame of the video sequence and that indicate an orientation of the frame while the frame was recorded;
determine a view orientation of the video sequence indicating an orientation of a device using, or to be used, to display the video sequence;
determine a frame of the video sequence is to be rotated when the device orientation of the frame is different than the view orientation, and to display both rotated and non-rotated frames of the video sequence according to the view orientation; and
provide a margin to non-rotated frames so that the rotated frames and non-rotated frames show images of substantially the same size.

22. The computer-readable medium of claim 21 wherein the available orientations are landscape and portrait;
wherein the device orientation indicator is a single bit indicating whether the device orientation during recording of a frame is in a landscape orientation or portrait orientation;
wherein the individual device orientation indicators are permitted to differ from frame to frame in the video sequence;
wherein the rotated frames provide an image that is smaller than an entire view area of a frame so that a margin is formed at the unoccupied portion(s) of the view area;

the instructions causing the computing device to at least one of:
  (1) provide the margin with at least one of a background color and background luminance; and
  (2) extend the scene of at least one rotated image onto the margins so that an image substantially fills the view area;
  use the image data of at least one other frame of the video sequence to determine the image data to be used to extend the rotated frame image onto the margin(s) of the frame; and
  use interpolation from a plurality of other frames in the video sequence to determine the image data to extend the rotated frame image onto the margin(s) of the frame;
the instructions causing the computing device to:
retrieve the device orientation indicator from the metadata of individual frames;
obtain the individual device orientation indicators embedded in data transmitted in a bitstream and data respectively associated with individual frames of the video sequence;
determine which part of a rotated frame to display in the view orientation when the entire rotated frame will not fit on a screen of a device playing the video sequence at the view orientation, wherein the determining of which part of a rotated frame to display comprises determining an overlap of the rotated frame and at least one other frame in the video sequence wherein the overlap is to be displayed on the rotated frame; and
perform at least one of object detection and multi-frame tracking to determine objects on the rotated frame similar to objects on other frames of the video sequence and that should be kept in the part of the rotated frame to be displayed.

* * * * *